United States Patent
Smith

(10) Patent No.: US 9,466,005 B2
(45) Date of Patent: Oct. 11, 2016

(54) METHOD AND SYSTEM FOR CLASSIFYING PAINTED ROAD MARKINGS IN AN AUTOMOTIVE DRIVER-VEHICLE-ASSISTANCE DEVICE

(71) Applicant: Tandent Vision Science, Inc., San Francisco, CA (US)

(72) Inventor: Casey Arthur Smith, Grand Junction, CO (US)

(73) Assignee: Tandent Vision Science, Inc., San Francisco, CA (US)

( * ) Notice: Subject to any disclaimer, the term of this patent is extended or adjusted under 35 U.S.C. 154(b) by 0 days.

(21) Appl. No.: 14/921,776

(22) Filed: Oct. 23, 2015

(65) Prior Publication Data

US 2016/0140416 A1   May 19, 2016

Related U.S. Application Data

(63) Continuation of application No. 14/543,425, filed on Nov. 17, 2014, now Pat. No. 9,218,534.

(51) Int. Cl.
| | | |
|---|---|---|
| G06K 9/00 | (2006.01) | |
| G06K 9/46 | (2006.01) | |
| B60R 11/04 | (2006.01) | |
| G06T 7/00 | (2006.01) | |
| G06T 7/40 | (2006.01) | |

(52) U.S. Cl.
CPC ............ G06K 9/4661 (2013.01); B60R 11/04 (2013.01); G06K 9/00798 (2013.01); G06K 9/4652 (2013.01); G06T 7/0042 (2013.01); G06T 7/0081 (2013.01); G06T 7/408 (2013.01); G06T 2207/10016 (2013.01); G06T 2207/10024 (2013.01); G06T 2207/20148 (2013.01); G06T 2207/30256 (2013.01)

(58) Field of Classification Search
CPC .................. G06T 2207/10024; G06T 7/408
See application file for complete search history.

(56) References Cited

U.S. PATENT DOCUMENTS

| | | | |
|---|---|---|---|
| 7,596,266 B2 | 9/2009 | Maxwell et al. | |
| 7,672,530 B2* | 3/2010 | Friedhoff | G06K 9/2018 358/3.26 |
| 7,865,031 B2* | 1/2011 | Bushell | G06T 5/006 382/274 |
| 7,873,219 B2 | 1/2011 | Friedhoff et al. | |
| 9,218,534 B1* | 12/2015 | Smith | G06K 9/00798 |
| 9,361,527 B1* | 6/2016 | Smith | G06K 9/00798 |
| 2007/0242878 A1* | 10/2007 | Maxwell | G06K 9/4652 382/168 |
| 2008/0118105 A1* | 5/2008 | Friedhoff | G06T 7/408 382/103 |
| 2011/0052047 A1* | 3/2011 | Smith | G06K 9/4652 382/164 |
| 2012/0008019 A1* | 1/2012 | Zhang | G06K 9/00791 348/251 |
| 2012/0008020 A1* | 1/2012 | Zhang | G06K 9/00791 348/251 |

(Continued)

*Primary Examiner* — Gandhi Thirugnanam
(74) *Attorney, Agent, or Firm* — Davdison, Davidson & Kappel, LLC

(57) ABSTRACT

An automated, computerized method is provided for processing an image. The method includes the steps of arranging a digital camera on a vehicle body, operating the digital camera to provide an image file depicting an image of a scene related to vehicle operation on a road, in a computer memory, receiving from the memory the image file depicting pixels of an image of the scene related to vehicle operation on a road, and using an analysis of the pixels to generate an illumination invariant image of the scene. A further process step includes using the illumination invariant image to analyze the road scene for painted road markings.

7 Claims, 14 Drawing Sheets

(56) References Cited

U.S. PATENT DOCUMENTS

| | | | | |
|---|---|---|---|---|
| 2012/0008021 A1* | 1/2012 | Zhang | ................ | G06K 9/00791 348/251 |
| 2013/0129208 A1* | 5/2013 | Friedhoff | ................ | G06T 5/008 382/165 |
| 2013/0324694 A1* | 12/2013 | Fruchey | .................. | C07C 51/02 528/335 |
| 2013/0342694 A1* | 12/2013 | Friedhoff | ........... | G06K 9/00791 348/148 |
| 2015/0207960 A1* | 7/2015 | Tomlinson | ........... | H04N 1/6077 382/167 |

\* cited by examiner

Figure 2: Pixel Array for Storing Image Data

| P(1, 1) | P(1, 2) | ... | P(1, M) |
|---------|---------|-----|---------|
| P(2, 1) | P(2, 2) | | |
| P(3, 1) | P(3, 2) | | |
| ... | | | ... |
| P(N, 1) | ... | | P(N, M) |

Image File 18

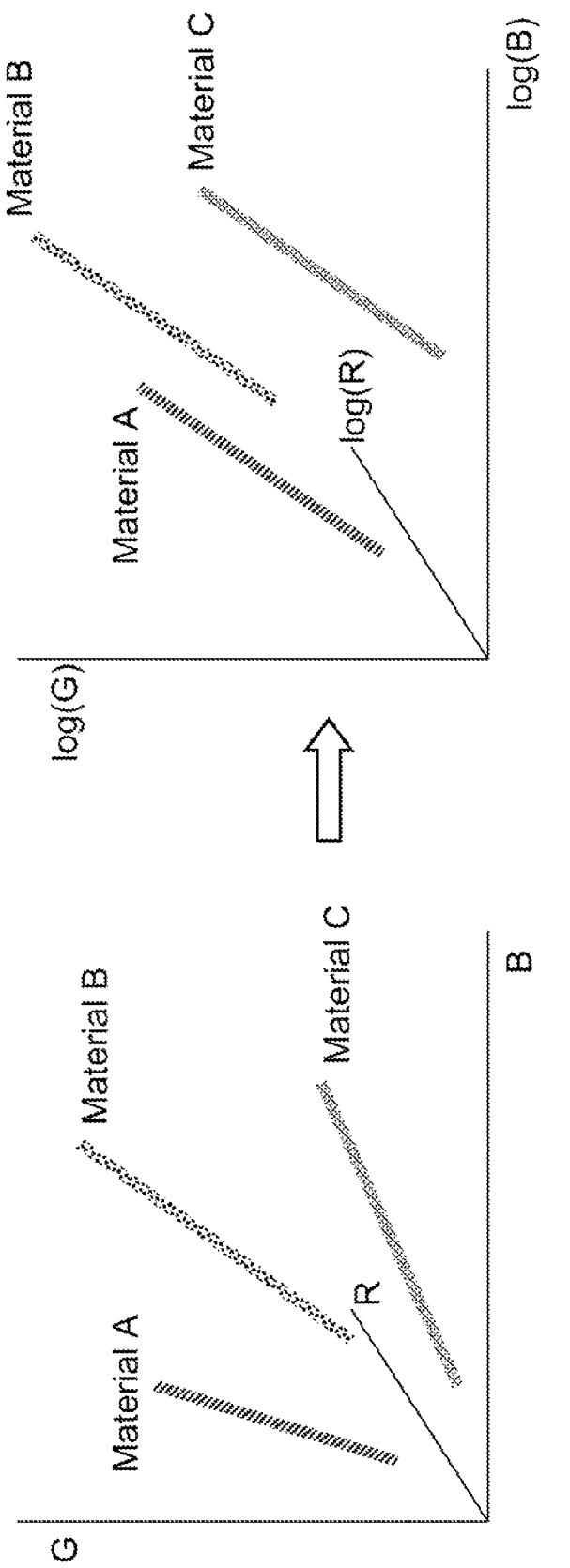
Figure 3: Log Color Space

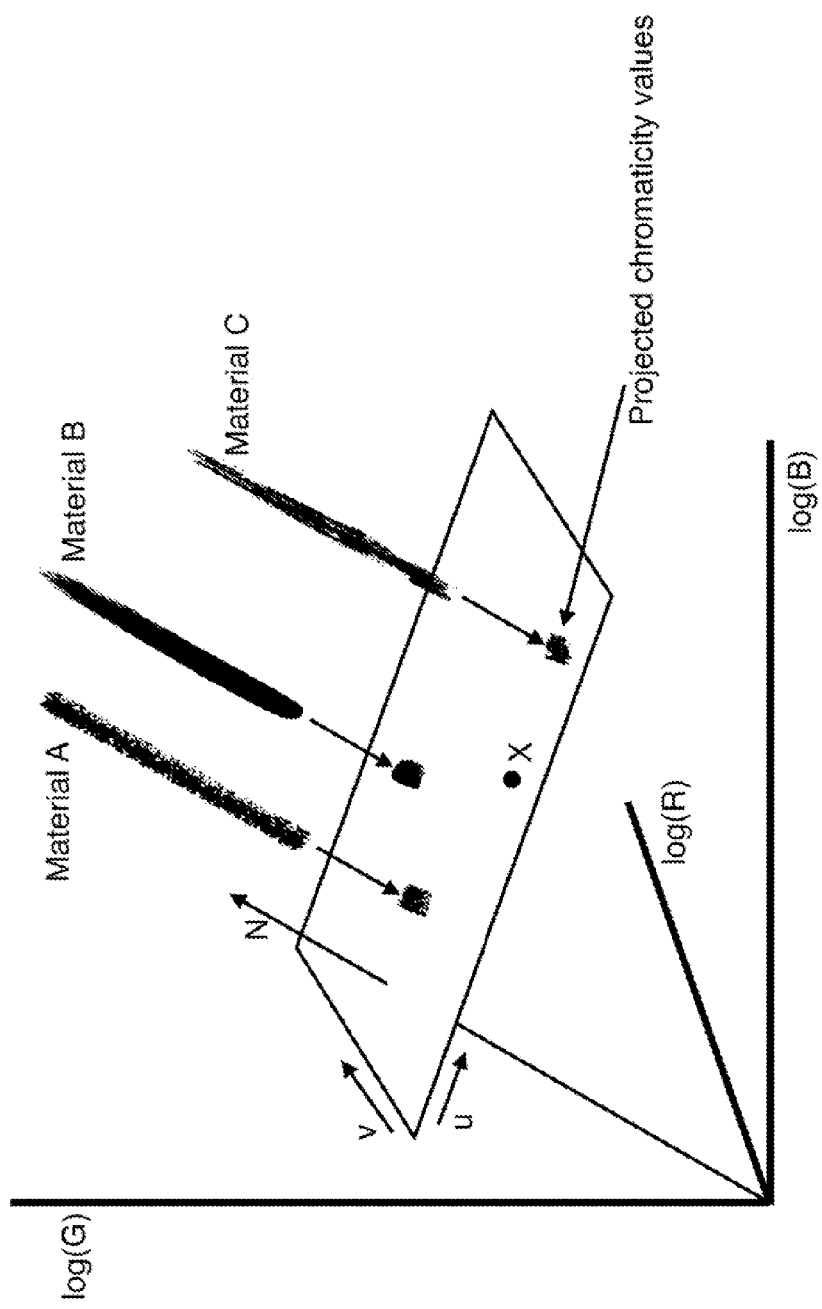
Figure 4: Log Color Space Chromaticity Plane

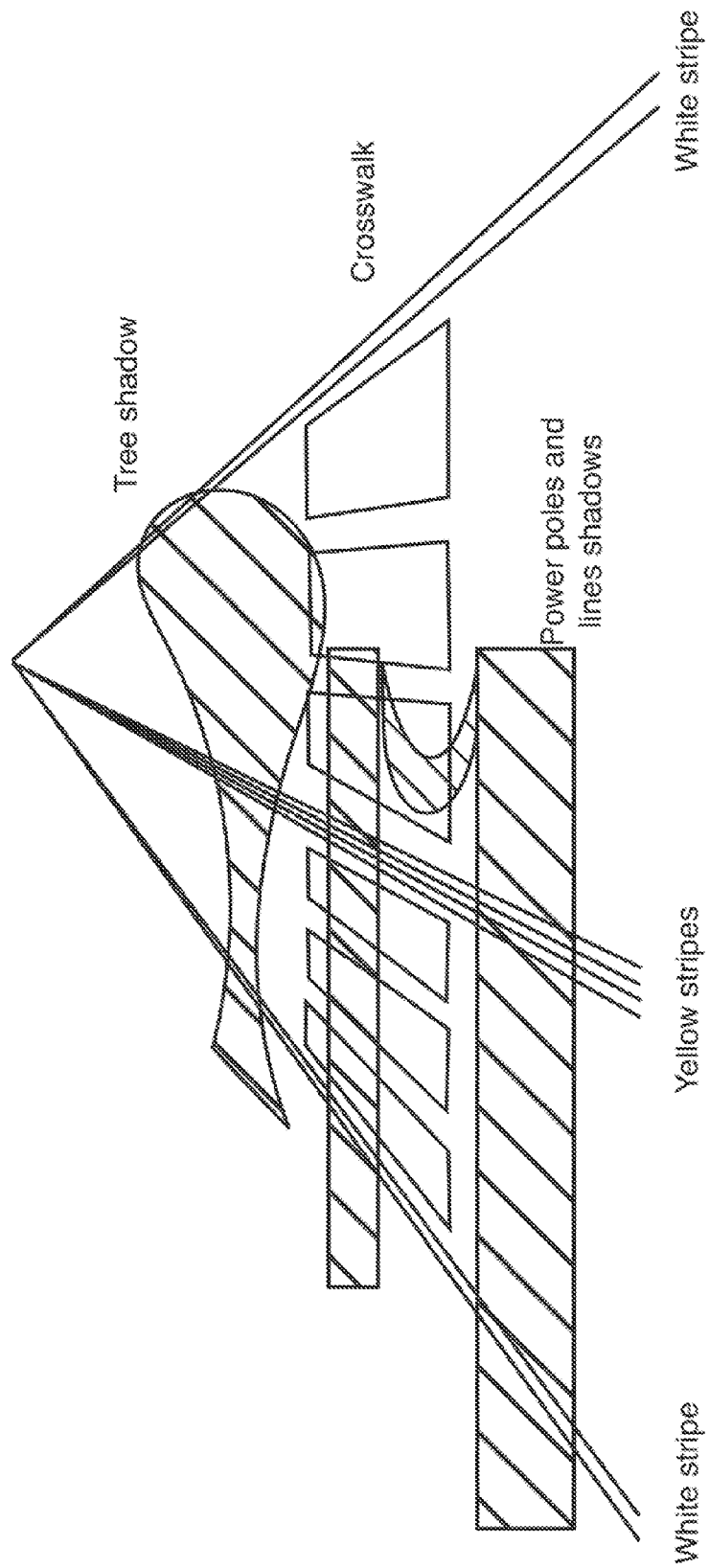
Figure 10: An image of a road with paint and shadows

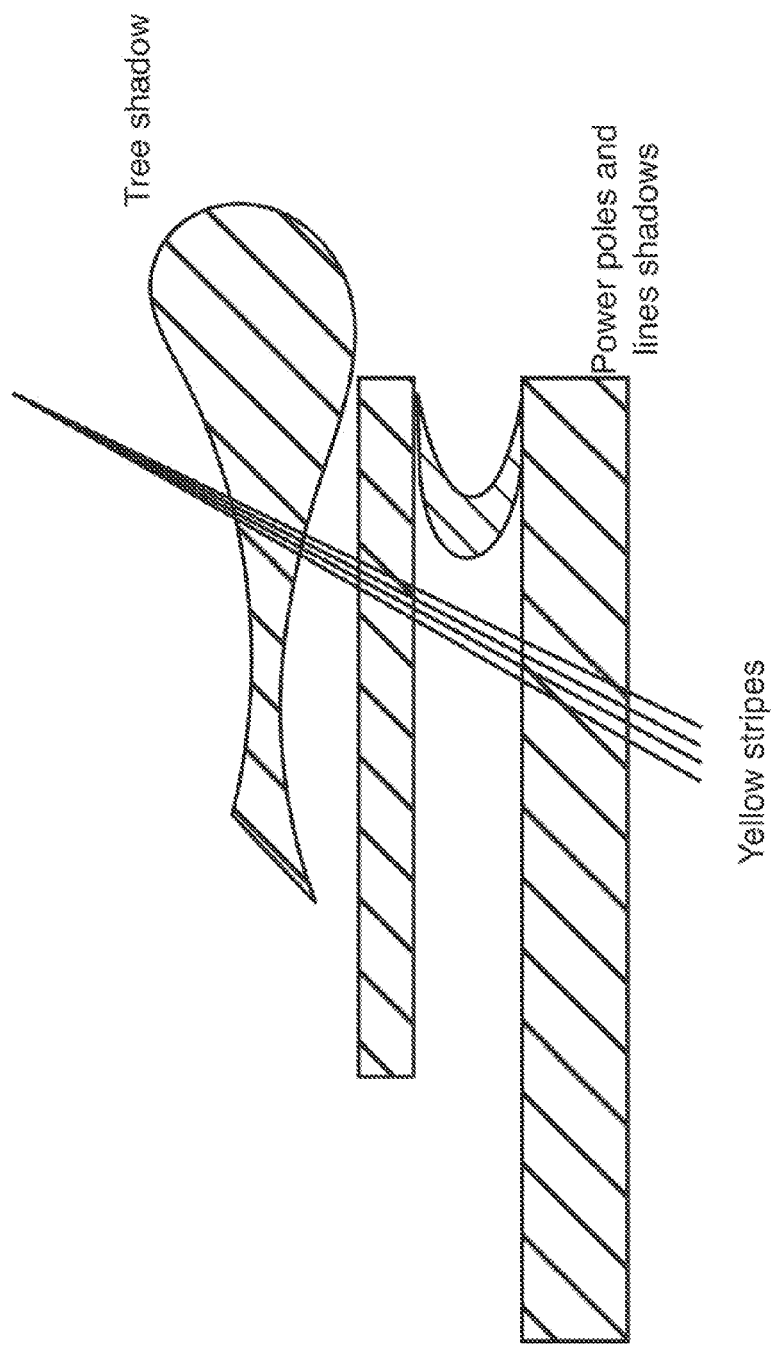
Figure 11a : A standard chromaticity image of a road scene

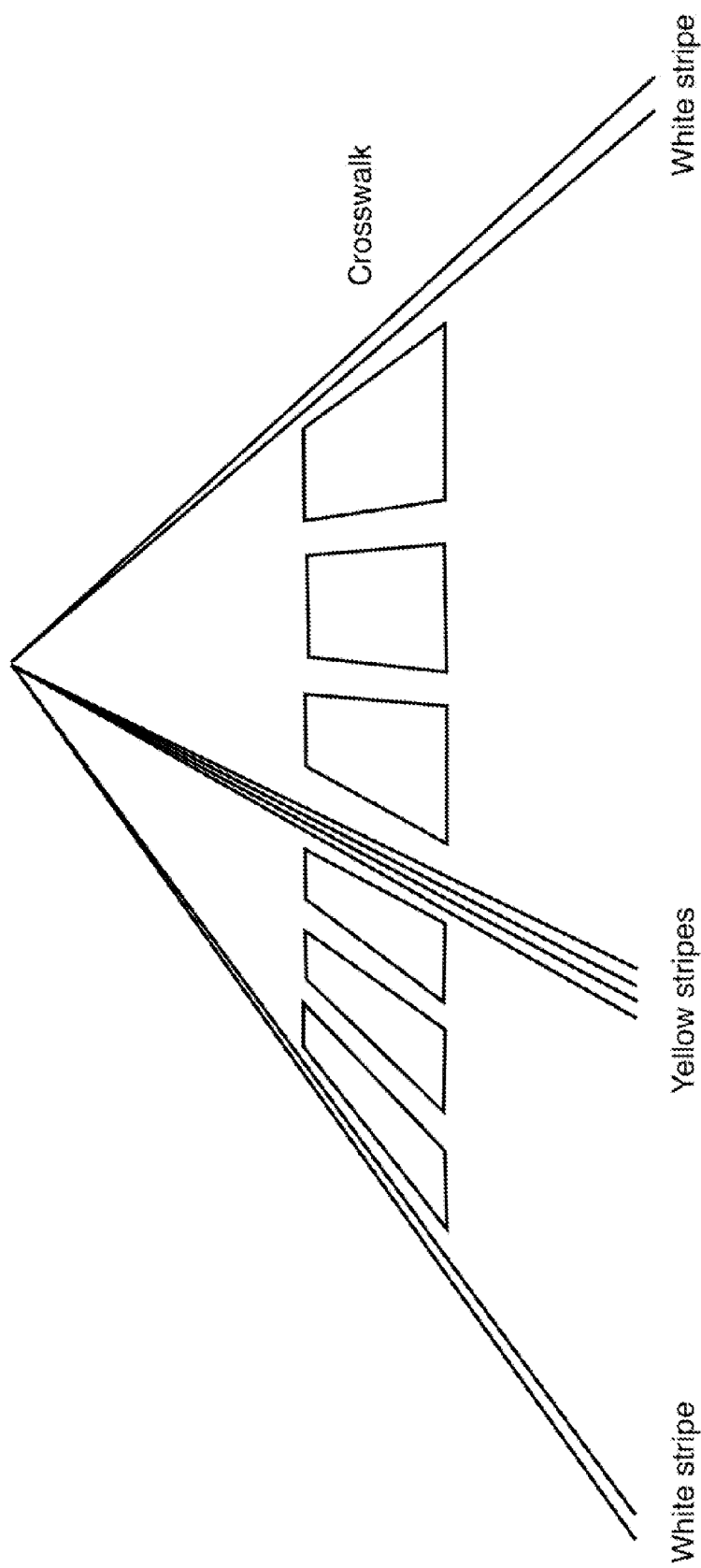
Figure 11b : Log space chromaticity image of a road scene

METHOD AND SYSTEM FOR CLASSIFYING PAINTED ROAD MARKINGS IN AN AUTOMOTIVE DRIVER-VEHICLE-ASSISTANCE DEVICE

This is a Continuation of U.S. patent application Ser. No. 14/543,425, filed on Nov. 17, 2014 and hereby incorporated by reference herein.

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy of computer performance. Significant pioneer inventions related to the illumination and material aspects of an image are disclosed in U.S. Pat. No. 7,873,219 to Richard Mark Friedhoff, entitled Differentiation Of Illumination And Reflection Boundaries and U.S. Pat. No. 7,672,530 to Richard Mark Friedhoff et al., entitled Method And System For Identifying Illumination Flux In An Image (hereinafter the Friedhoff Patents).

SUMMARY OF THE INVENTION

The present invention provides an improvement and enhancement to the fundamental teachings of the Friedhoff Patents, and includes a method and system comprising image techniques that accurately and correctly generate illumination invariant versions of road images to facilitate identification of painted road markings, for use in an automotive driver-vehicle-assistance device.

In a first exemplary embodiment of the present invention, an automated, computerized method is provided for processing an image. According to a feature of the present invention, the method comprises the steps of arranging a digital camera on a vehicle body, operating the digital camera to provide an image file depicting an image of a scene related to vehicle operation on a road, in a computer memory, receiving from the memory the image file depicting pixels of the image of a scene related to vehicle operation on a road, each one of the pixels having N band color values, transforming the N bands to log color space values in a log color space, generating a log chromaticity plane in the log color space, identifying pixels meeting criteria indicating suitability for use in determining an accurate orientation for the log chromaticity plane, according to a BIDR model, using the identified pixels to sample image color at each of pre-selected bright and dark locations relative to each one of the identified pixels, and calculate, for each one of the identified pixels, an orientation for the log chromaticity plane, as a function of the sample image color, to provide a set of proposed orientations, using the set of proposed orientations to identify a dominant orientation, orienting the log chromaticity plane in the dominant orientation, projecting the log color space values to the chromaticity plane to provide chromaticity representation values corresponding to the pixels of the image, and using the chromaticity representation values corresponding to the pixels to generate an illumination invariant image of the scene.

In a second exemplary embodiment of the present invention, a computer program product, disposed on a non-transitory computer readable media is provided. The computer program product includes computer executable process steps operable to control a computer to: receive an image file depicting pixels of an image of a scene related to vehicle operation on a road, in a computer memory, each one of the pixels having N band color values, transform the N bands to log color space values in a log color space, generate a log chromaticity plane in the log color space, identify pixels meeting criteria indicating suitability for use in determining an accurate orientation for the log chromaticity plane, according to a BIDR model, use the identified pixels to sample image color at each of pre-selected bright and dark locations relative to each one of the identified pixels, and calculate, for each one of the identified pixels, an orientation for the log chromaticity plane, as a function of the sample image color, to provide a set of proposed orientations, use the set of proposed orientations to identify a dominant orientation, orient the log chromaticity plane in the dominant orientation, project the log color space values to the chromaticity plane to provide chromaticity representation values corresponding to the pixels of the image and use the chromaticity representation values corresponding to the pixels to generate an illumination invariant image of the scene.

In a third exemplary embodiment of the present invention, a device is provided. The device comprises a computer system adapted to be coupled to a digital camera adapted for mounting on a vehicle to record an image of a scene related to vehicle operation on a road and the computer system including a memory storing an image file comprising pixels of an image of the scene, the computer system being arranged and configured to execute a routine to, receive the image file depicting pixels of an image of the scene related to vehicle operation on a road, from the computer memory, each one of the pixels having N band color values, transform the N bands to log color space values in a log color space, generate a log chromaticity plane in the log color space, identify pixels meeting criteria indicating suitability for use in determining an accurate orientation for the log chromaticity plane, according to a BIDR model, use the identified pixels to sample image color at each of pre-selected bright and dark locations relative to each one of the identified pixels, and calculate, for each one of the identified pixels, an orientation for the log chromaticity plane, as a function of the sample image color, to provide a set of proposed orientations, use the set of proposed orientations to identify a dominant orientation, orient the log chromaticity plane in the dominant orientation, project the log color space values to the chromaticity plane to provide chromaticity representation values corresponding to the pixels of the image, and use the chromaticity representation values corresponding to the pixels to generate an illumination invariant image of the scene.

In accordance with yet further embodiments of the present invention, computer systems are provided, which include one or more computers configured (e.g., programmed) to perform the methods described above. In accordance with other embodiments of the present invention, non-transitory computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programed to carry out the steps of the methods of the present invention.

BRIEF DESCRIPTION OF THE DRAWINGS

FIG. 2 shows an n×m pixel array image file for an image stored in the computer system of FIG. 1b.

FIG. 3 is a graphic representation of a log color space.

FIG. 4 is a graphic representation of a log color space chromaticity plane according to a feature of the present invention.

FIG. 6b shows an example for a lit road color detection histogram, formed during the execution of the flow chart of FIG. 6a.

FIG. 10 shows a scene of a road with paint markings and cast shadows.

FIGS. 11a &b show depictions of the road scene of FIG. 10, FIG. 11a showing a depiction of the road scene when analyzed using a standard chromaticity technique, FIG. 11b showing a depiction of the road scene when analyzed using a log color space, according to the present invention.

DETAILED DESCRIPTION OF THE PREFERRED EMBODIMENTS

Figure 1A:
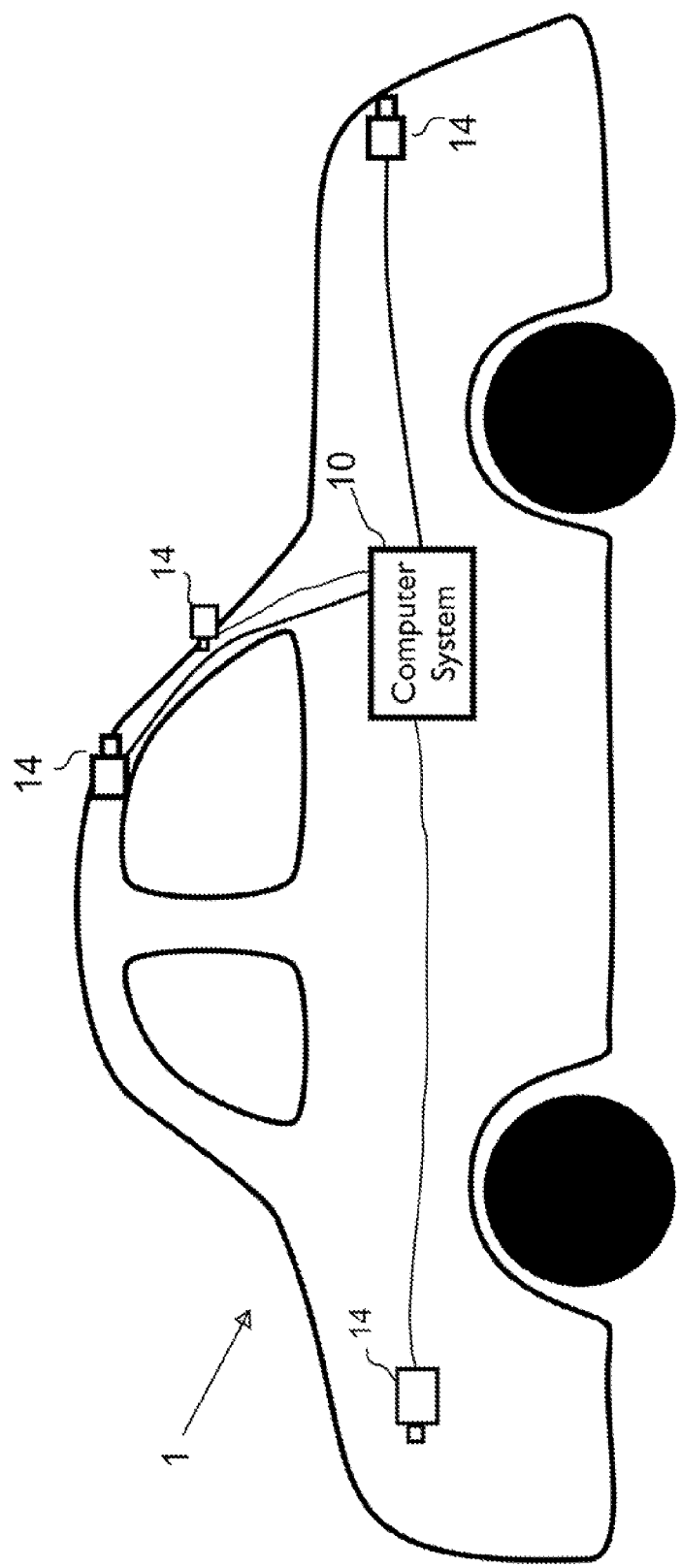
FIG. 1a is a schematic illustration of a motor vehicle, including a computer system arranged as a driver-assistance device, according to a feature of the present invention.

Referring now to the drawings, and initially to FIG. 1a, there is shown a motor vehicle such as, for example, an automobile 1. A computer system 10 is mounted within the automobile 1, and is coupled to one or more cameras 14, arranged at various locations on the automobile 1. The arrangement of the cameras 14 is such that selected cameras 14 are focused on scenes relevant to vehicle operation, for example, the road scene in front of the vehicle, the driver, the road scene behind the vehicle, and so on. Accordingly, various scenes depicting views of the road and the driver can be input to the computer system 10. The various scenes, in addition to analysis for generating illumination invariant versions of recorded images, as will be described, can be arranged to provide stereo pairs of the road scene images for use by the computer system 10 to calculate depth information.

Figure 1B:
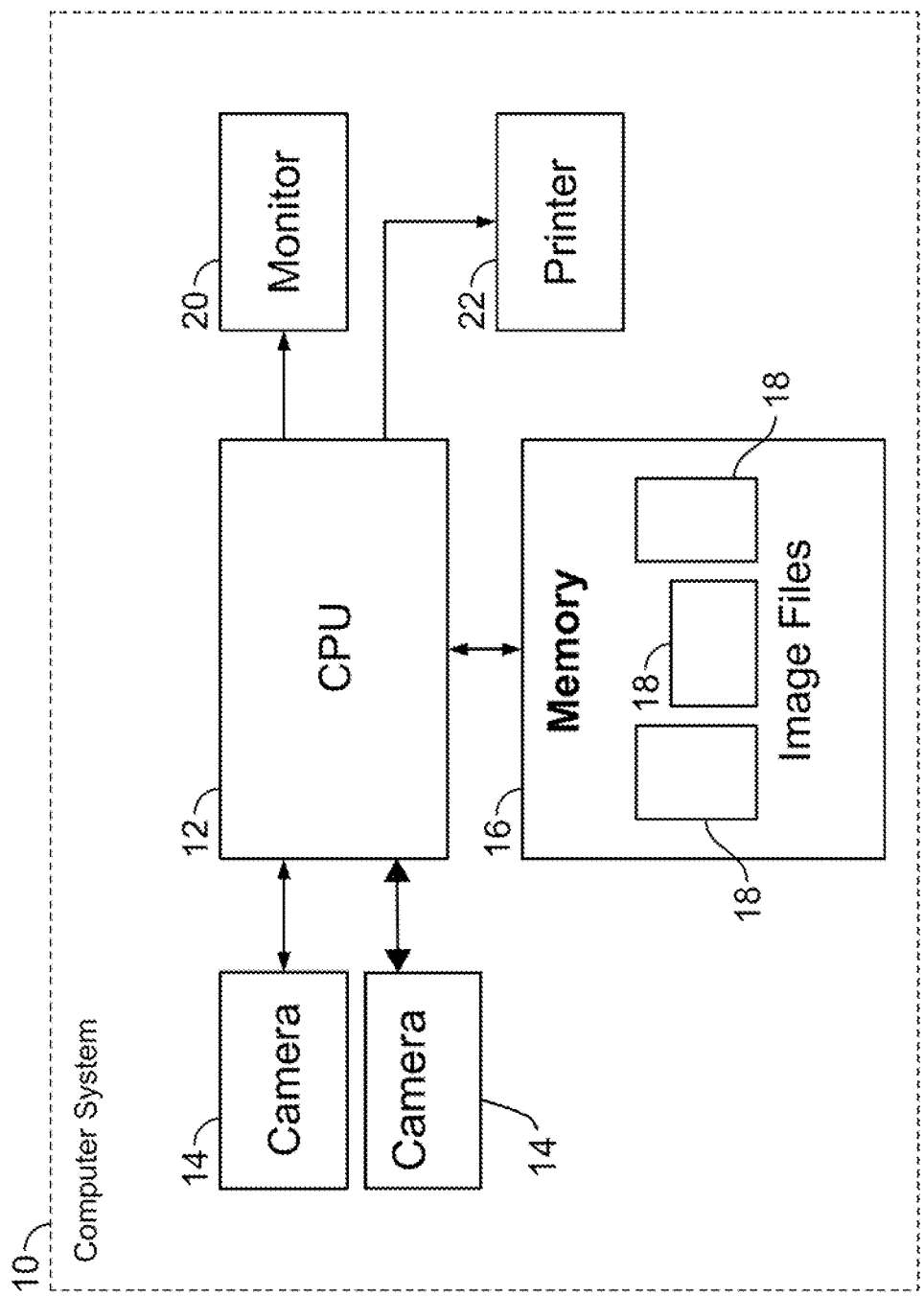
FIG. 1b is a block diagram of the computer system of FIG. 1a arranged and configured to perform operations related to road images, according to a feature of the present invention.

FIG. 1b shows a block diagram of the computer system 10 arranged and configured to perform operations related to images. A CPU 12 of the computer system 10 is coupled to each of the digital cameras 14 via, for example, a USB port. The digital cameras 14 operate to download images of the road scenes and/or the driver recorded and stored locally on the cameras 14, to the CPU 12. The CPU 12 stores the downloaded images in a memory 16 as image files 18. The image files 18 can be accessed by the CPU 12 for use in a vehicle driver-vehicle-assistance operation.

Alternatively, the CPU 12 can be implemented as a microprocessor embedded in a device such as, for example, the digital camera 14. The CPU 12 can also be equipped with a real time operating system for real time operations related to images, in connection with, for example, an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, manipulation of road images to provide illumination invariant versions of the images for use in identifying painted markings on a road.

According to the teachings of U.S. Pat. No. 7,596,266, an illumination invariant version of an image can be generated by projecting log color values from an image, to a log chromaticity plane. As clearly shown in FIG. 3, due to the mathematical properties of logarithmic values, the log transforms of material color lines A, B, C, of an RGB color space, form parallel lines in a log color space. In the illustration of FIG. 3, the materials A, B and C correspond to materials depicted in an image stored in an image file 18, and the colors of the materials vary in the RGB space, as a function of the interplay between incident and ambient illuminants forming the illumination present at the time the image was recorded, for each material, from full shadow to fully lit.

Referring now to FIG. 4, a log chromaticity plane is arranged in the log color space, and oriented along a normal line N. As taught in U.S. Pat. No. 7,596,266, when the orientation N is set as a function of a bi-illuminant, dichromatic reflection model (BIDR Model), the projected chromaticity values (as shown in FIG. 4) provide a truly accurate illumination invariant representation because the BIDR model upon which the representation is based, accurately and correctly represents the illumination variation due to the interplay between the incident and ambient illuminants forming the illumination that caused the original image.

As shown in FIG. 4, the RGB values of each pixel in an image file 18, via the corresponding log color values, (for example, materials A, B and C) can be mapped by the CPU 12 from the image file value p(n, m, R, G, B), as shown in FIG. 2, to a log value, then, through a projection to the chromaticity plane, to a corresponding u, v value on the log chromaticity plan, as shown in FIG. 4. Each pixel p(n, m, R, G, B) in the image file 18 is then represented by a corresponding two dimensional chromaticity value: p(n, m, u, v), to provide an illumination invariant chromaticity representation of the original RGB image.

According to a feature of an exemplary embodiment of the present invention, an offset color X is selected so as to position the log chromaticity plane within the log color space at a position enclosing a selected set of log colors, as shown in FIG. 4. Thus, each u, v coordinate in the plane is located at a corresponding log color value in the log RGB space, and each pixel projection, for example, for the materials A, B and C can be expressed by the log RGB value of the u, v plane coordinate where the respective material pixels are projected. In the exemplary embodiment, the log color value (log(0.33), log(0.33), log(0.33)) is used for the offset color X to define a set of colors within the log chromaticity plane that represent reasonable colors for use in the road analysis objective of the present invention. The log RGB illumination invariant chromaticity representation is then used by the CPU 12 for an accurate analysis of a road scene to identify painted markings such as white and yellow lane markings, turn indications, cross walks, etc., as will appear.

Figure 5:
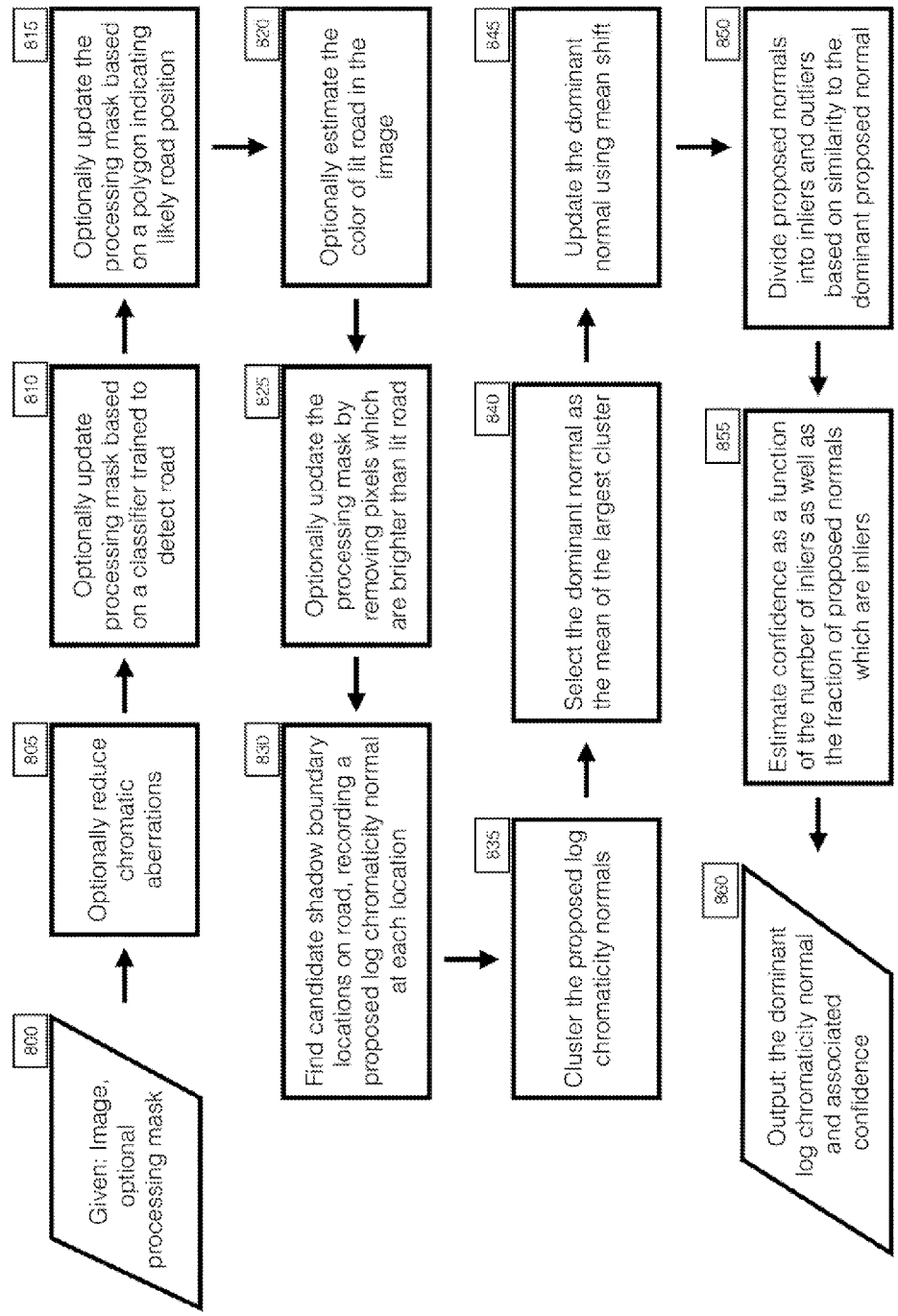
FIG. 5 is a flow chart for determining an orientation for the log chromaticity plane of FIG. 4 according to a feature of the present invention.

According to a feature of the present invention, advantage is made of the physical environment present in a road scene, to estimate an orientation N for the log chromaticity plane that accurately reflects a BIDR model function. Referring now to FIG. 5, there is shown a flow chart for determining an orientation for the log chromaticity plane of FIG. 4. In step 800, the CPU 12 operates to access, from the memory 16, an image file 18 depicting an image of a scene recorded by one of the cameras 14, for example, the camera 14 at the front most of the vehicle 1. The CPU 12 can optionally mask out sections of the image that are not part of the road scene, for example, any portions of the vehicle depicted in the recorded scene, sky, and so on.

In step 805, the CPU 12 can operate to correct chromatic aberrations in the image, for example, by implementing the methods taught in U.S. Pat. No. 7,865,031. According to a feature of the present invention, chromatic aberration parameters are detected for a first image file 18 of a sequence of image files 18 forming a video of the road scene before the vehicle 1, and then stored for use in removing chromatic aberrations from the subsequent image files 18 of the video, to minimize execution times. Alternatively, chromatic aberration parameters for the camera 14 installed on the vehicle 1 can be hard-coded in the computer system 10.

In step 810, the CPU 12 can optionally update the processing mask applied in step 800, to detect the road depicted in the image file 18, using a classifier trained to detect road. The update can include, for example, removal of non-road areas such as trees, buildings and so on.

In step 815, the CPU 12 can be operated to further update the processing mask, for example, using a polygon-shaped opening based upon likely road position. In an exemplary embodiment of the present invention, a trapezoid is used. Given the viewing angle of the camera 14, and the geometry of the mounting used to fix the camera onto the vehicle 1, it can be determined where the horizon appears, if the vehicle 1 is positioned on a level surface. The trapezoid is then centered horizontally with the width of the top horizontal line of the polygon dimensioned with a width of 10% as wide as the image at the horizon line, and with the bottom of the polygon as a horizontal line aligned with the bottom line of the image, and with a width of 80% of the width of the image. Such a configuration provides an accurate region of interest for the camera 14, thereby providing an image recording targeted on the road surface to be analyzed by the CPU 12.

According to a feature of the present invention, the various optional masking steps can be arranged to improve execution efficiency by placing the region of interest in the image to be processed by the CPU 12 on the road surface, and eliminating scene features not relevant to road markings to be detected by the CPU 12.

In step 820, the CPU 12 is operated to estimate the color of the lit road depicted in the image file 18 being processed.

Figure 6A:
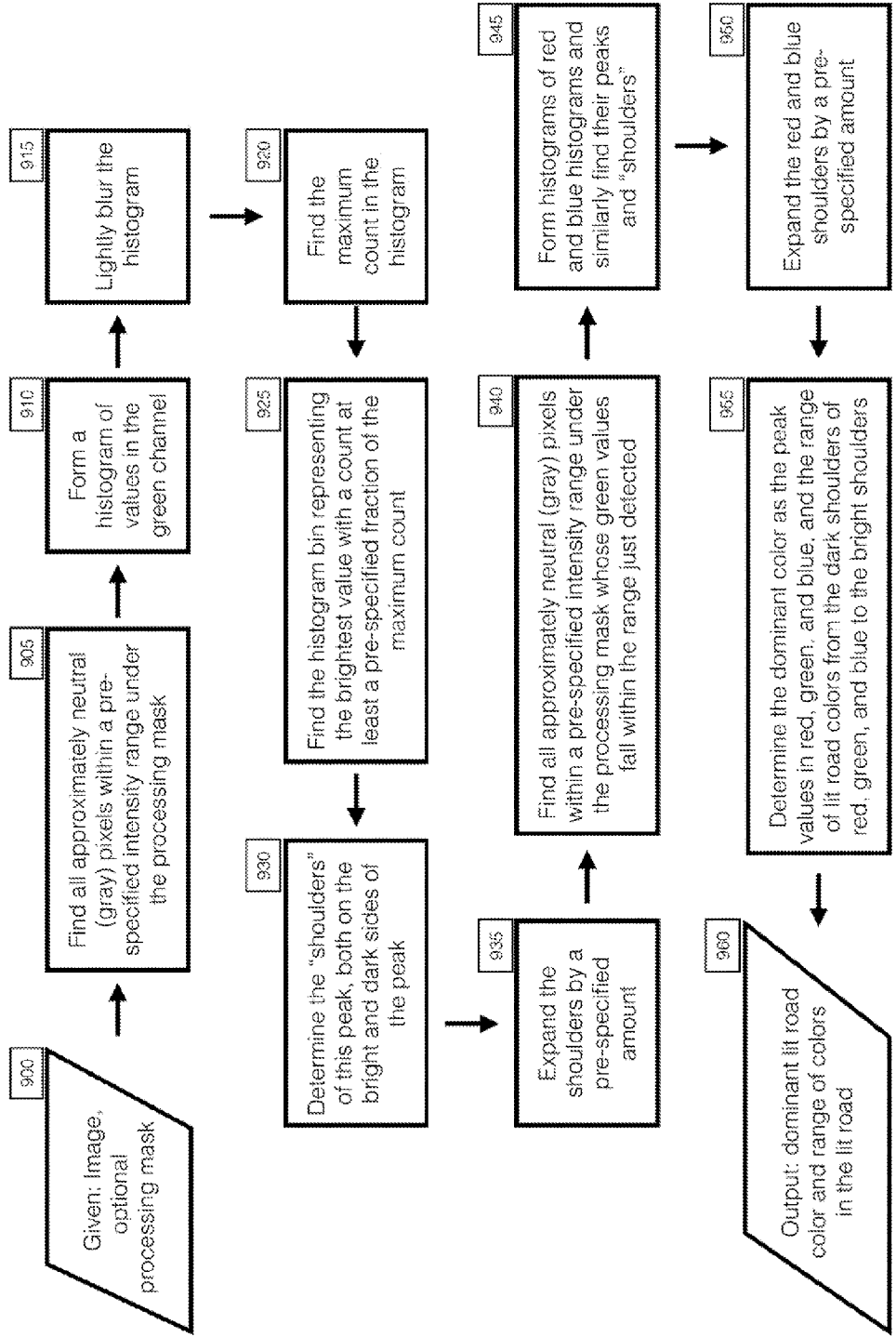
FIG. 6a is a flow chart for estimating lit road color.

Referring now to FIG. 6a, there is shown a flow chart for estimating lit road color, for execution of step 820 of FIG. 5. In step 900, the CPU accesses the image file 18 being processed, optionally modified by one or more of the optional masking steps, as described above. In step 905, the CPU 12 analyzes the pixels of the image file 18 to locate and identify all pixels having an approximately neutral (grey) value, within a pre-specified intensity range. For example, lit road pixels can be required to be between 0.05 and 0.5 in intensity and white balanced such that no channel among the red, green and blue channels is more than 40% brighter than another one of the channels.

Figure 6B:
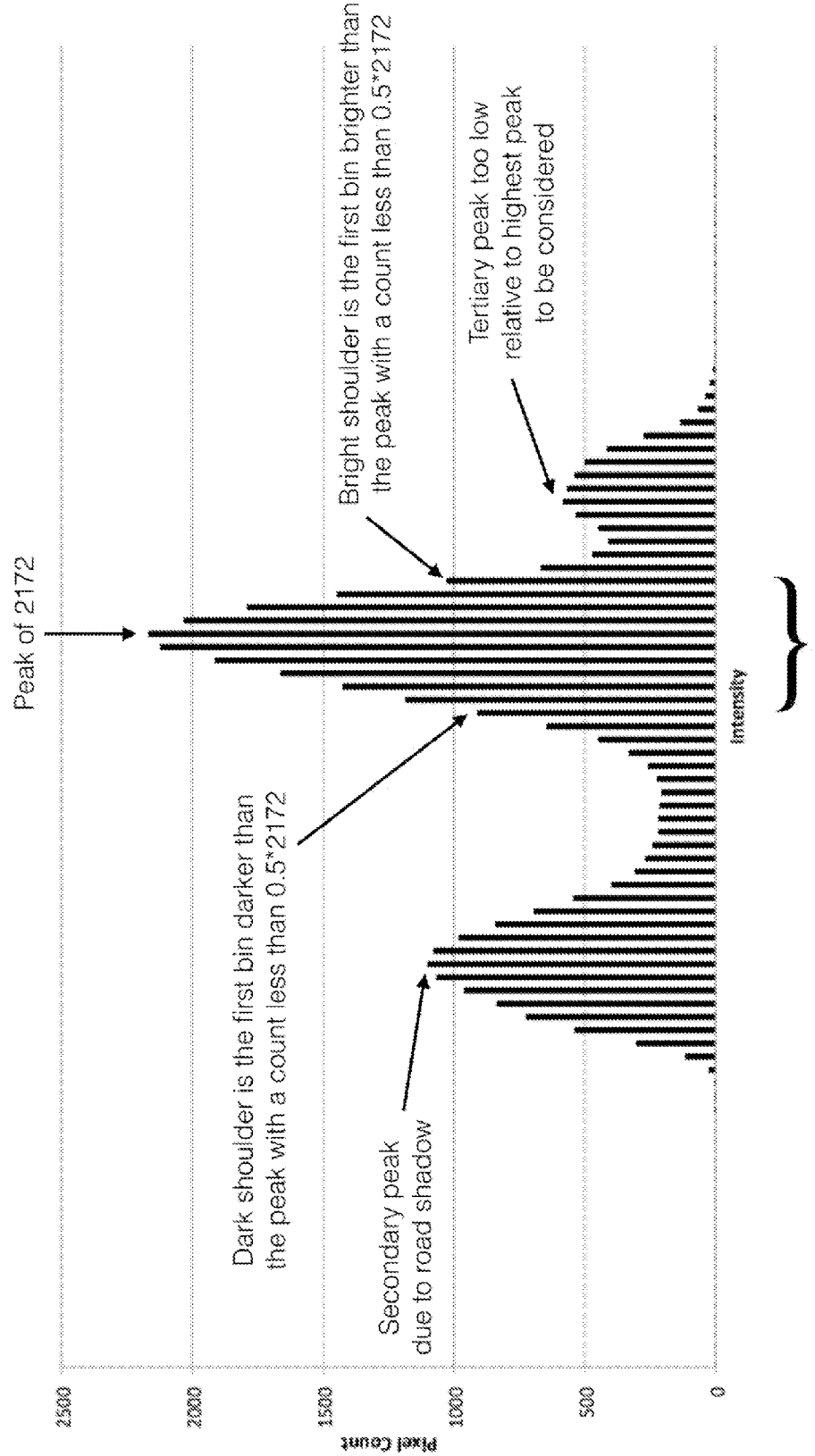

In step 910, the CPU 12 forms a histogram of values for the identified neutral pixels, in the green channel. In an exemplary embodiment of the present invention, the histogram is divided into 100 bins on a log scale, each indicating a number of neutral pixels with a specified green channel intensity value of between 0.05 and 0.5. FIG. 6b shows an example of a lit road color detection histogram.

In step 915, the CPU 12 operates to blur the histogram to reduce noise, for example, by convolving the histogram with a kernel set at (0.25, 0.5, 0.25).

In step 920, the CPU 12 analyzes the green channel histogram to identify the histogram bin with the highest count of neutral pixels. As shown in the example of FIG. 6b, the peak bin has 2172 pixels.

In step 925, the CPU 12 again analyzes the green channel histogram to identify the bin having a highest intensity value and also having a count being at a pre-selected percentage of the count in the highest count bin identified in step 920, for example, at least 80%. This is to ensure that when there are two peaks of similar height, for example, if the peak marked "secondary peak" in the example of FIG. 6b, had a pixel count of 2200, the CPU 12 can be more accurate in selecting the correct brightest peak.

In step 930, the CPU 12 determines the shoulders of the peak selected in steps 920, 925. As shown in the example of FIG. 6b, the bright shoulder is the first bin having an intensity higher than the intensity of the peak bin, and with a pixel count less than 50% of the 2172 pixel count of the peak bin.

As also shown in the example of FIG. 6b, the dark shoulder is the first bin having an intensity that is lower than the intensity of the peak bin, and with a pixel count less than 50% of the 2172 pixel count of the peak bin.

A detected lit road intensity range is defined as the range of intensity values for the set of bins between the dark shoulder bin and the bright shoulder bin, as shown in the example of FIG. 6b. In step 935, the CPU 12 expands the lit road intensity range. For example, the intensity of the bright shoulder is increased by 25%, and the intensity of the dark shoulder is decreased by 25%.

In step 940, the CPU 12 operates to identify all of the neutral pixels from step 905, having a green channel intensity within the lit road intensity range set in step 935.

In step 945, the CPU 12 repeats the histogram forming and analysis steps (steps 910-930, the example of FIG. 6b) for each of the red and blue channels, based upon the pixels identified in step 940 (the green channel analysis).

In step 950, the CPU 12 expands the lit road intensity range determined for each of the red and blue channels in step 945. For example, the intensity of the bright shoulder in each of the red and blue histograms is increased by 25%, and the intensity of the dark shoulder in each of the red and blue channels is decreased by 25%.

In step 955, the CPU 12 utilizes the results of the histogram analysis described above, and generally shown in the example of FIG. 6b, to determine the dominant color of the road surface, as well as the range of lit road colors, from a dark shoulder to a bright shoulder. For example, the RGB values for the dominant road surface color, and color range, is set at a red value corresponding to the intensity of the peak from the red channel histogram, and having a range from the dark shoulder to the bright shoulder of the red channel histogram, a green value corresponding to the intensity of the peak from the green channel histogram, and having a range from the dark shoulder to the bright shoulder of the green channel histogram, and a blue value corresponding to the intensity of the peak from the blue channel histogram, and having a range from the dark shoulder to the bright shoulder of the blue channel histogram.

In step 960, the CPU 12 outputs and stores the dominant lit color for the road, and the color range for the lit road.

Returning once again to FIG. 5, after performance of step 820 to estimate the color of the lit road (the flow chart of FIG. 6a), the CPU 12 proceeds to step 825. In step 825, the CPU 12 optionally updates the mask to remove pixels that are brighter than the lit road. Pixels that are brighter than the lit road are not useful to an accurate determination of log chromaticity plane orientation.

In step 830, the CPU 12 operates to locate candidate shadow boundary locations and record a proposed log chromaticity normal for each candidate location.

Figure 7:
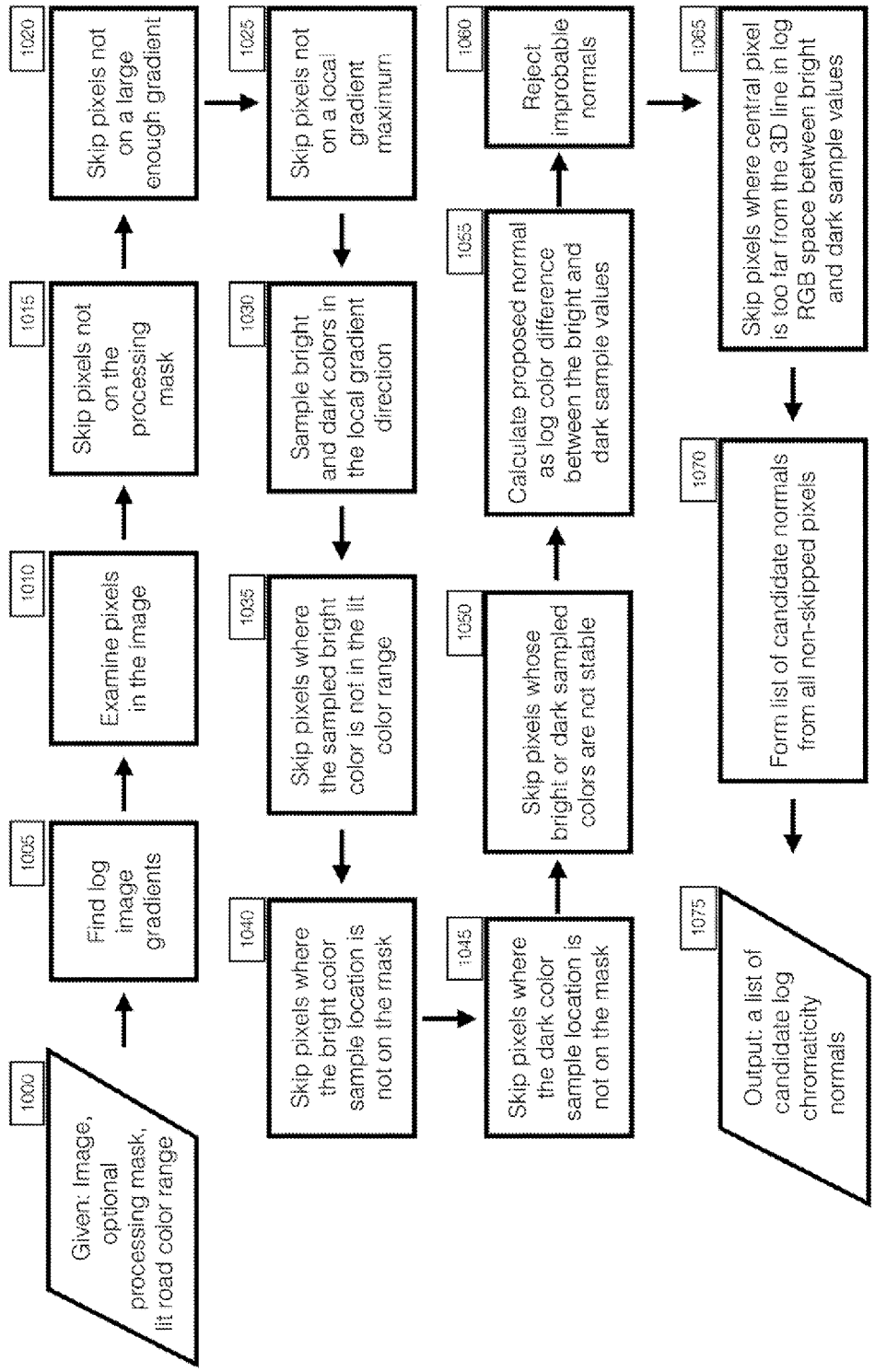
FIG. 7 is a flow chart for calculating candidate normals for use in the determination of an orientation according to the flow chart of FIG. 5.

Referring now to FIG. 7, there is shown a flow chart for calculating candidate normals for use in the determination of an orientation for the log chromaticity plane, according to step 830 of FIG. 5. In step 1000, the image file 18 being processed, the processing mask, and lit road color range for the image file 18 are input to the CPU 12. In step 1005, the CPU 12 calculates image gradients, as is generally known. For example, the gradients can be simple pixel differences between adjacent pixels in the x and y directions (corresponding to the N, M pixel designations of FIG. 2).

In step 1010, the CPU 12 begins an examination of the pixels depicted in the image file 18 to identify pixel locations meeting criteria indicating suitability for use in determining accurate orientations for the log chromaticity normal. The examination starts in step 1015, where the CPU 12 skips pixels not on the processing mask. In step 1020, the CPU 12 examines gradients for the remaining pixels of the image file 18, relative to a threshold value. The threshold value is set such that shadow boundaries on a sunny day are above the threshold, while mild road textures are not above the threshold value. The threshold value is also fixed relative to the characteristics of the camera/lens combination installed on the vehicle 1, and can be tuned for improved efficiency and accuracy. For example, the rejection of a higher amount of pixels not suitable for use in determining a normal orientation, reduces overall computation time, improving efficiency, and accuracy can be reduced when too many candidate locations are selected due to increased spurious results.

In step 1025, the CPU 12 further reduces pixel locations to be considered by rejecting pixels that are not on a local gradient maximum. This is performed by examining the magnitude for the gradients of pixels one pixel away from the pixel being examined, in each of the gradient and negative gradient directions. When the magnitude of the gradient for the pixel being examined is not at least equal to or greater than the magnitudes of the gradients for the neighboring pixels, the pixel is rejected.

In step 1030, the CPU 12 samples bright and dark colors, in each of the gradient and negative gradient directions, respectively, for each remaining pixel being examined. The sampled colors can be based upon a single pixel, or an average color of a patch of pixels, for example, a 3×3 pixel array. The pixel or array of pixels selected for the color sampling, in each of the gradient direction from the pixel being examined, or in the direction opposite to the gradient (negative gradient), is spaced a pre-selected distance from the pixel being examined. For example, the distance can be set at a specified fraction of the image size. In an exemplary embodiment, the distance is set at ⅓₃ of image width. The sample distance can also be varied as a function of image row location. For example, a shorter sample distance can be set when the location is near the horizon, and a longer sample distance when the location is near the bottom of the frame.

In an alternative exemplary embodiment of the present invention, the color samples can be refined by selecting an initial sample location, in each of the gradient direction and negative gradient direction, and then determining the darkest and brightest pixel along the respective paths from the pixel being examined to each sample location.

In step 1035, the CPU 12 examines the sampled bright color to determine whether the color is within the lit road color intensity range identified in the execution of the routine of FIG. 6a. When the sampled color for a pixel is not within the lit color intensity range, the pixel is rejected.

In step 1040, the CPU 12 rejects any pixels when the bright sampled color location is not within the processing mask.

In step 1045, the CPU 12 rejects any pixel when the dark sampled color location is not within the processing mask.

In step 1050, the CPU 12 examines each of the remaining pixels to determine the stability of the corresponding sampled bright and dark colors. Stability is measured in terms of the compactness of a set of measurements, such as a standard deviation or mean absolute deviation. For example, if in the execution of step 1050, the bright and dark colors are each selected as an average of a 3×3 pixel array, the standard deviation or mean absolute deviation of the 3×3 pixel array can also be calculated. In the execution of step 1050, the compactness of the colors sampled to create the average color for the bright color and the compactness of the colors sampled to create the average color for the dark color are compared to a predefined threshold. If the sampled color distributions are not compact enough, the corresponding pixel is rejected. For example, when the mean absolute deviation of a sampled color is greater than 0.025, the corresponding pixel is rejected. This avoids sampling average colors that are on a material edge, an illumination edge or in an area of excessive texture.

In step 1055, the sampled bright and dark colors for each of the pixels remaining after execution of the previous steps are used to calculate a set of proposed normals for the orientation of the log chromaticity plane. The bright and dark sampled colors for each pixel are considered to be lit and shadowed colors, suitable to provide a corresponding normal orientation for the log chromaticity plane, according to the BIDR model. A proposed normal is calculated by the CPU 12 as the log color difference between the bright and dark sampled colors for each one of the remaining pixels to provide the set of proposed normals.

In step 1060, the CPU 12 executes a series of tests on each of the proposed normals calculated in step 1055, and rejects any normal appearing to be improbable as an orientation in a road scene, according to the test results. In a first test, the CPU 12 examines the un-normalized magnitude. The difference between bright and dark sampled colors must be sufficiently large to avoid noisy samples. For example, the sampled color difference used for a normal calculation must be at least 0.15 in log color space, for all channels, and at least 0.3 when the channel differences are averaged. Any proposed normal having a magnitude less than these values is rejected.

In a second test, the CPU 12 optionally checks if the proposed normal orientation is neutral. Typically, the difference between a road surface and white paint is a neutral difference, and, therefore, a neutral orientation results in road and white paint pixels projecting to the same u,v coordinates on the log chromaticity plane, removing the ability to distinguish between the pixels. Neutrality is defined in terms of color saturation. In an exemplary embodiment of the present invention, saturation is measured as the dot product between a proposed normal being examined and the neutral vector (0.577, 0.577, 0.577). The closer the dot product is to 1, the closer the proposed normal is to being neutral. All proposed normals having a dot product at some selected value near 1 or more, for example, 0.999, are rejected.

In a further optional test, the CPU 12 tests if each remaining proposed normal correspond to a normal that is typical in a road setting, for example, an upwardly facing surface in daylight. At one extreme, with an entire sky filled with white clouds, a normal orientation is near neutral (0.577, 0.577, 0.577). At an opposite extreme, sunset with a clear sky, the normal orientation is similar to (0.789, 0.537, 0.299). Normals can be visualized as points on a sphere. Typical daylight normals are similar to points on an arc on the sphere between the neutral normal (0.577, 0.577, 0.577) and the sunset normal (0.789, 0.537, 0.299). Thus, any proposed normal having a value near the arc, for example, within 0.01 of the arc, is considered valid as a reasonable orientation for the road analysis. Proposed normals further from the arc are rejected.

Another constraint can be to require the red channel of a proposed normal to be greater than the green channel, for example, by at least 0.02, and the green channel be greater than the blue channel, also, for example, by at least 0.02.

In step 1065, the CPU 12 examines each remaining pixel with a proposed normal to determine if the pixel used to find the sample colors defining the respective proposed normal has a color relationship to the sampled colors consistent with a shadow boundary. For example, in a true shadow boundary, penumbra colors are a weighted average of the colors for the lit and shadowed regions surrounding the shadow boundary. The pixels with proposed normals were each selected among pixels with large gradients and are each the local maxima, as described above. Accordingly, the pixel for each corresponding proposed normal should be near the log RGB line between the respective sampled bright and dark colors for that pixel. For example, the candidate pixel must have a squared euclidean distance of no more than 0.0015 from the log RGB line. If the candidate pixel is more than the 0.0015 distance, the respective normal is rejected.

In step 1070, the CPU 12 compiles a list of the proposed normals remaining after execution of the previous steps of the flow chart of FIG. 7.

In step 1075, the CPU 12 outputs the list of proposed normals to complete execution of step 830 of FIG. 5.

Returning once again to FIG. 5, in step 835, the CPU 12 operates to cluster the remaining proposed normals from step 830, using any known clustering method. For example, an online "leader-follower" clustering method is implemented due to the computational efficiency and the ability to specify a cluster radius.

In step 840, the CPU 12 operates to select as a dominant normal the mean of the cluster containing the most proposed normals.

In step 845, the CPU 12 operates to update the dominant value by executing a mean shift procedure. A mean shift procedure is a known technique for refining a point value by finding a local peak density among a distribution of points. In the execution of the mean shift procedure, the radius used can be either larger or smaller than the radius used in the clustering step, and in the exemplary embodiment, the radius used in the mean shift procedure is equal to the radius used for clustering.

In step 850, the CPU 12 divides all of the proposed normals into inliers and outliers based upon a measure of similarity to the refined dominant normal identified in steps 840 and 845. Proposed normals within a pre-selected range of similarity to the dominant normal are designated as inliers, while those outside the range are designated as outliers. In an exemplary embodiment of the present invention, normals within a squared euclidean distance of 0.002 of the dominant normal are considered to be inliers.

In step 855, the CPU 12 estimates a confidence level as a function of the number of inliers and outliers. For example, the total number of inliers as well as the percentage of inliers relative to the total number of proposed normals, can be considered in establishing a confidence level. Two inliers would equate to a very low confidence level that the dominant normal is an accurate normal orientation, while 200 inliers would justify a high level of confidence. Similar confidence levels can be based upon the percentage of proposed normals that are classified as inliers.

In step 860, the CPU outputs and stores the dominant normal and associated confidence level.

Figure 8:
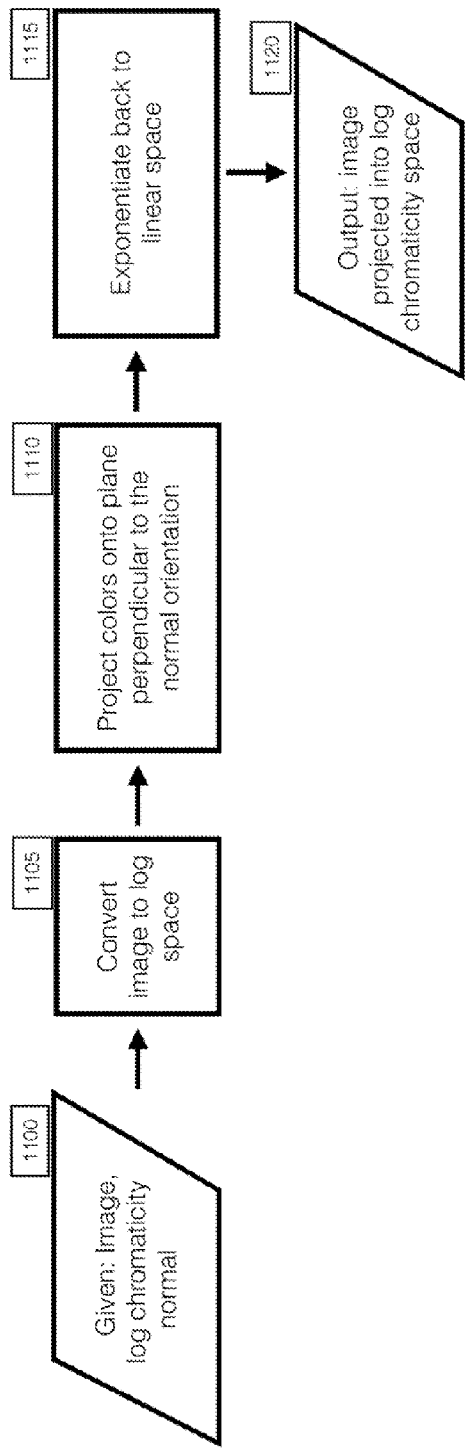
FIG. 8 is a flow chart for projecting image colors onto the log chromaticity plane of FIG. 4.

Referring now to FIG. 8, there is shown a flow chart for projecting image colors onto the log chromaticity plane, as shown in FIG. 4. In step 1100, the image file 18 being processed, and the dominant normal orientation determined through execution of the flow chart of FIG. 5, are input to the CPU 12.

In step 1105, the CPU 12 converts the RGB colors of each pixel to a log color space, as shown in FIG. 3 for the example of materials A, B and C, depicted in the image file 18.

In step 1110, the CPU 12 projects the log color value of each pixel of the image file 18, represented in our example by material A, B and C, to the log chromaticity plane. In the exemplary embodiment of the present invention, the log chromaticity plane is oriented with a normal N oriented according to the dominant normal determined through execution of the flow chart of FIG. 5, and offset such that the plane includes the offset location of (log(0.33), log(0.33), log(0.33)), as described above and shown in FIG. 4. In this manner, each projected log RGB color for the material colors A, B and C, is expressed by a log color value useful in the road analysis objective of the present invention.

In step 1115, the CPU 12 operates to exponentiate the projected log RGB colors for the pixels of the image file 18 to a linear space to provide a set of illumination invariant RGB values for the image pixels.

In step 1120, the CPU outputs the illumination invariant, log chromaticity version of the image depicted in the image file 18 being processed.

Figure 9:
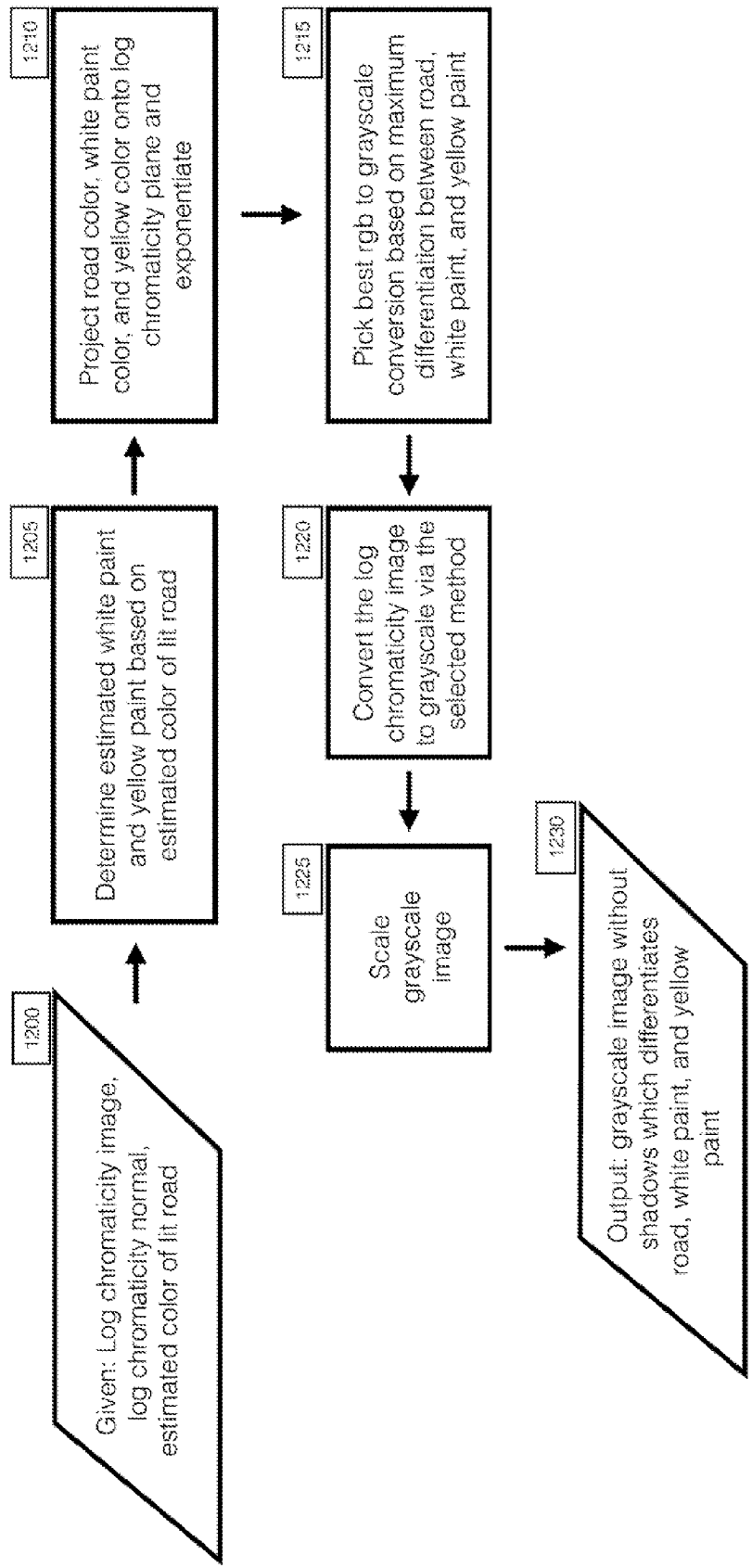
FIG. 9 is a flow chart for converting the projection according to the flow chart of FIG. 8, into a grayscale image.

Referring now to FIG. 9, there is shown a flow chart for converting the projection according to the flow chart of FIG.

8, into a grayscale image. In step 1200, the RGB illumination invariant, log chromaticity version of the image provided through execution of the flow chart of FIG. 8, the dominant normal orientation determined through execution of the flow chart of FIG. 5, and the estimated color of the lit road obtained through execution of the routine of FIG. 6, are input to the CPU 12.

In step 1205, the CPU 12 uses the estimated lit road color to estimate painted road marking colors, such as, for example, white and yellow markings typically used on roads. The estimates can be based upon real world data, such as a set of images of existing roads having white and/or yellow markings. The CPU 12 analyzes the images of the set of images to determine an average color difference between lit road color and white road markings or yellow road markings, as the case may be, from samples of lit road/ marking color pairs obtained from the set of images. A more conservative estimate can be based upon the $5^{th}$ percentile log color difference between road color and road marking color (for example, white or yellow). Alternatively, white color can be considered any pixel at a fixed offset to the lit road color, for example, a color that is twice as bright as the lit road color in all channels. Likewise, the estimated yellow paint color can be determined as fixed offset from the lit road color, for example, a color equal to the lit road color, except twice as bright in the red channel. The color offset information is used to estimate a white color and/or yellow color, based upon the known estimate for the lit road color.

In step 1210, the CPU 12 projects each of the lit road color, and white paint color and/or yellow paint color, as estimated in step 1205, onto the log chromaticity plane to obtain the corresponding log RGB colors. The CPU 12 then operates to exponentiate the log color values from the log chromaticity plane back to linear RGB values to provide RGB colors corresponding to each of the lit road color, white paint color and yellow paint color.

In step 1215, an RGB to grayscale conversion is selected. The selection is based upon a maximum differentiation between road, white paint and yellow paint, and can be selected from one of the red channel, the blue channel, the blue channel minus the red channel and the blue channel divided by the red channel.

In step 1220, the CPU 12 converts the RGB log chromaticity image to grayscale via the method selected in step 1215.

In step 1225, the CPU 12 operates to scale the image. According to a feature of the present invention, the grayscale contrasts are maximized to clearly display and contrast road from white and/or yellow markings. In an exemplary embodiment of the present invention, the image is contrast-stretched such that the road surface is scaled to gray, yellow markings are scaled to black and white markings are scaled to white. The scaling can be a piece-wise linear segment, performed in two segments. For example, if x, y and z represent the grayscale values for yellow paint, road surface and white paint respectively, then, for values less than y, a linear scaling maps x to 0.1 (near black), and y to 0.5 (middle gray). Then for values greater than y, a second linear scaling maps y to 0.5, and z to 0.9 (near white).

In step 1230, the CPU 12 outputs the grayscale image as an illumination invariant image including a sharp contrast depiction of road surfaces depicted as middle gray, white markings as near white, and yellow markings as near black.

According to a feature of the present invention, the routines of the above-described flow charts can be executed in a multiple thread operation. For example, a road scene video includes a sequence of frames, each comprising an image file 18, to depict the motion of the vehicle 1 along a road. A first thread includes execution of the routine of FIG. 5, to detect a dominant normal orientation for the log chromaticity plane, on every xth frame, for example, every fifth frame. In an alternative embodiment, the first thread is executed to completion of the routine of FIG. 5, then selects a next available frame to update the dominant normal. Thus, the number of frames between dominant normal detections can vary due to different execution times each time the routine of FIG. 5 is executed. In a second thread, the routine of FIGS. 8 and 9, to generate the illumination invariant grayscale representation of the road scene, can be executed relative to every frame. Since the dominant normal orientation changes slowly over time, the dominant normal from an earlier frame can be used in a current frame, hence there is no need to determine a dominant normal in each frame. To reduce noise in the detected dominant normal, temporal smoothing can be performed, for example, by using a weighted average of a fixed number of previous measurements for the dominant normal, or with the use of a Kalman filter.

Referring once again to FIGS. 1a & 1b, the CPU 12 can store the grayscale images in the memory 10 of the computer system 10 of the automobile 1. The CPU 12 can then be operated to execute a known object recognition engine, and/or optical character recognition engine (OCR) relative to illumination invariant, sharp contrast representations of the image. The outputs of the various recognition engines provide an identification of unique features in the scene, including objects such as, for example, lane markings and the text and/or signs of street markings. The use of illumination invariant versions of images of a scene enables a more accurate and precise analysis of image features by the selected engine, to identify the unique features, without the complexity in image appearance that can be caused by varying illumination present at the time the scene was recorded (for example, shadows).

The improved and accurate output information can be analyzed and processed using, for example, additional input information such as, for example, automobile operation status, such as speed, GPS, radar and/or sonar information, vehicle-to-vehicle communications, weather conditions, and so on, and/or depth information calculated from the radar input or from a stereo set of scenes provided by the cameras 14.

FIG. 10 shows a scene of a road with paint markings and cast shadows. As shown, the road includes white and yellow stripes, as well as a cross walk consisting of rectangular-shaped painted markings. In the scene there are also shadows cast across the road from a tree, and power poles and power lines. In an assisted driving system, it is necessary to identify and distinguish between the road surface and the painted markings so that indications can be generated to assist a driver of the vehicle 1. The cast shadows complicate the road image, and make the task of identifying the painted markings difficult.

When a standard chromaticity space is used, for example, normalizing the intensity of every pixel to a pre-specified value, the complicating factors caused by the cast shadows are not removed. Because ambient light in the cast shadows is distinctly bluer than the light in the lit areas of the road scene, the chromaticity of the shadowed areas will also be distinctly bluer than the chromaticity of the lit areas. Moreover, by removing intensity differences, but not color differences, in the standard chromaticity image, the difference between white painted markings and, for example, a grey or black road surface disappears, and all shadows remain, as shown in the road depiction shown in FIG. 11a. It should also be noted that the yellow markings will change color in the shadows due to the bluer color caused by the ambient light.

In sharp contrast, when processing a road video using the log chromaticity color space according to the present invention, there is sharp contrast between all painted markings and the road surface, and all shadows are eliminated from the image, as shown in FIG. 11b. This is because the log chromaticity plane is oriented in a non-neutral orientation, according to the predictions of the BIDR model. In an outdoor road scene, the ambient light from the sky is bluer than direct sunlight. The non-neutral orientation accurately removes color differences caused by variations in illumination, from shadowed areas to fully lit areas, resulting in white color markings and road surface color projecting to different colors on the log chromaticity plane, and a clear depiction of the yellow painted areas, without any complications caused by the presence of shadows.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. For use in a vehicle, an automated, computerized method for processing an image, comprising the steps of:
   receiving from a digital camera mounted on the vehicle, an image file depicting pixels of an image of a scene related to vehicle operation on a road, each one of the pixels having N band color values;
   transforming the N bands to log color space values in a log color space;
   generating a log chromaticity plane in the log color space;
   identifying pixels meeting criteria indicating suitability for use in determining an accurate orientation for the log chromaticity plane, according to a BIDR model and based upon an analysis of the pixels of an image of a scene related to vehicle operation on a road, wherein the pixel analysis is based upon an estimate of lit road color;
   calculating an orientation for the log chromaticity plane, according to a BIDR model, as a function of the identified pixels;
   projecting the log color space values to the chromaticity plane to provide chromaticity representation values corresponding to the pixels of the image; and
   using the chromaticity representation values corresponding to the pixels to generate an illumination invariant image of the scene.

2. The method of claim 1 including the further step of using the illumination-invariant representation of the image to analyze the scene for painted road markings.

3. For use in a vehicle, an automated, computerized method for processing an image, comprising the steps of:
   receiving from a digital camera mounted on the vehicle, an image file depicting pixels of an image of a scene related to vehicle operation on a road, each one of the pixels having N band color values;
   transforming the N bands to log color space values in a log color space;
   generating a log chromaticity plane in the log color space;
   identifying pixels meeting criteria indicating suitability for use in determining an accurate orientation for the log chromaticity plane, according to a BIDR model and based upon an analysis of the pixels of an image of a scene related to vehicle operation on a road, wherein the pixel analysis is based upon an estimate of lit road color;
   calculating an orientation for the log chromaticity plane, according to a BIDR model, as a function of the identified pixels;
   projecting the log color space values to the chromaticity plane to provide chromaticity representation values corresponding to the pixels of the image;
   using the chromaticity representation values corresponding to the pixels to generate an illumination invariant image of the scene;
   receiving from the digital camera a series of image files, to depict a road video; and
   performing a multi-thread operation, in a first thread, performing the step to calculate the orientation, and in a second thread, performing the steps to generate the illumination invariant image of the scene.

4. The method of claim 3 wherein the first thread operates on a subset of the series of image files, and the second thread operates on all of the series of image files.

5. The method of claim 3 including the further step of using the illumination-invariant representation of the image to analyze the scene for painted road markings.

6. A device comprising:
   a computer system adapted to be coupled to a digital camera adapted for mounting on a vehicle to record an image of a scene related to vehicle operation on a road; and
   the computer system including a memory storing an image file comprising pixels of an image of the scene;
   the computer system being arranged and configured to execute a routine to:
   receive from the memory, an image file depicting pixels of an image of a scene related to vehicle operation on a road, each one of the pixels having N band color values;
   transform the N bands to log color space values in a log color space;
   generate a log chromaticity plane in the log color space;
   identify pixels meeting criteria indicating suitability for use in determining an accurate orientation for the log chromaticity plane, according to a BIDR model and based upon an analysis of the pixels of an image of a scene related to vehicle operation on a road, wherein the pixel analysis is based upon an estimate of lit road color;
   calculate an orientation for the log chromaticity plane, according to a BIDR model, as a function of the identified pixels;
   projecting the log color space values to the chromaticity plane to provide chromaticity representation values corresponding to the pixels of the image; and
   using the chromaticity representation values corresponding to the pixels to generate an illumination invariant image of the scene.

7. A computer program product, disposed on a non-transitory computer readable media, the product including computer executable process steps operable to control a computer to:
   receive an image file depicting pixels of an image of a scene related to vehicle operation on a road, in a computer memory, each one of the pixels having N band color values;

transform the N bands to log color space values in a log color space;
generate a log chromaticity plane in the log color space;
identify pixels meeting criteria indicating suitability for use in determining an accurate orientation for the log chromaticity plane, according to a BIDR model and based upon an analysis of the pixels of an image of a scene related to vehicle operation on a road, wherein the pixel analysis is based upon an estimate of lit road color;
calculate an orientation for the log chromaticity plane, according to a BIDR model, as a function of the identified pixels;
projecting the log color space values to the chromaticity plane to provide chromaticity representation values corresponding to the pixels of the image; and
using the chromaticity representation values corresponding to the pixels to generate an illumination invariant image of the scene.

* * * * *